United States Patent [19]
Hartz

[11] 3,985,000
[45] Oct. 12, 1976

[54] ELASTIC JOINT COMPONENT

[76] Inventor: Helmut Hartz, Hedwistr. 24, Wanne-Eickel, Germany, 4680

[22] Filed: Sept. 12, 1975

[21] Appl. No.: 612,808

[30] Foreign Application Priority Data
Nov. 13, 1974 Germany............................ 2453688

[52] U.S. Cl................................... 64/12; 403/220; 403/57; 403/337
[51] Int. Cl.²............................................. F16D 3/58
[58] Field of Search ........... 403/220, 335, 336, 337, 403/291, 41, 52, 57; 64/12, 13, 15 B, 19

[56] References Cited
UNITED STATES PATENTS

| | | | |
|---|---|---|---|
| 1,283,787 | 11/1918 | Jencick | 64/13 |
| 2,435,058 | 1/1948 | Thomas | 64/13 |
| 2,701,456 | 2/1955 | Brownstein | 64/15 B |
| 2,864,245 | 2/1958 | Amberg | 64/12 |
| 2,928,264 | 3/1960 | Goldsmith | 64/13 X |
| 3,316,737 | 5/1967 | Hulley | 64/13 |
| 3,788,099 | 1/1974 | Miller | 64/12 |

FOREIGN PATENTS OR APPLICATIONS
445,450 2/1949 Italy.......................... 64/12

*Primary Examiner*—Wayne L. Shedd
*Attorney, Agent, or Firm*—Karl F. Ross; Herbert Dubno

[57] ABSTRACT

A joint inserted between a driving member and a driven member, such as a pair of substantially coaxial shafts or a shaft and a flywheel, comprises a stack of annular steel foils each having an even number of peripherally equispaced webs which are alternately secured to the two members via respective pairs of screws. The webs are interconnected by integral strips in the form of outwardly and/or inwardly bulging lobes enabling relative angular and radial shifting of the two members without exertion of a significant axial force upon them. The screws pass through mounting holes in the webs whose distance from the stack axis is greater than half the maximum radius of the foils.

8 Claims, 5 Drawing Figures

ELASTIC JOINT COMPONENT

FIELD OF THE INVENTION

My present invention relates to an elastic joint to be inserted between a driving member and a driven member for the transmission of torques, with limited relative angular and radial mobility of these members allowing a certain parallel or angular disalignment of their axes.

BACKGROUND OF THE INVENTION

Joints of this type are known in which a number of stacked foils (usually of steel) have radially extending arm, the arms of adjacent foils being peripherally interleaved; the arms of alternate foils are bolted to one member while those of the remaining foils are bolted to the other member. The clearances thus left between parallel arms bolted to the same member facilitate the buckling of these arms under radially inward pressure; they also tend to subject the bolts or screws at the ends of the stacked arms to both shear and flexural stresses. This, in turn, requires the use of rather heavy bolts and also prevents the joint from transmitting compressive forces between the two members; in effect, therefore, only half the arms of each foil of either set are utilized for the transmission of radial forces from one member to the other.

With a joint of this type having arms peripherally spaced 45° apart, each foil will then have only two arms available for the transmission of radial forces. Each arm, therefore, must be so dimensioned as to be capable of absorbing half these forces, which in the case of heavy-duty equipment leads to a rather cumbersome assembly of low flexibility.

OBJECTS OF THE INVENTION

The general object of my present invention, accordingly, is to provide an improved joint of this type obviating the aforestated difficulties.

Another object is to provide a joint of this description which exerts only an insignificant axial restoring force upon the two members thus interconnected.

SUMMARY OF THE INVENTION

I realize these objects, in conformity with my present invention, by the provision of a generally cylindrical stack of annular foils of spring steel or the like, each forming an even number of peripherally spaced webs separated by gaps which are bridged by flat links integrally interconnecting these webs, the latter being provided with mounting holes (preferably two holes per web) on a circle whose radius is greater than half the maximum foil radius. The webs of all foils are in mutual registry, with their mounting holes aligned to form throughgoing bores for the passage of bolts or other fasteners securing alternate webs of each foil to the driving and the driven member respectively.

In this way, every foil of the stack participates in the torque transmission from the driving to the driven member. Since the webs contact one another without intervening clearances, there is no danger of buckling so that both tensile and compressive forces can be transmitted in a radial direction. On the contrary, the superposed webs reinforce one another so that the individual foils can be made quite thin. The continuous throughgoing bores formed by the aligned mounting holes transmit only shear stresses to the fastening bolts or the like and do not subject them to any flexing. The location of these holes on a circle of relatively large radius allows the interconnecting links to be made relatively long so that each foil will be highly flexible.

The links may be generally elbow-shaped strips forming inwardly and/or outwardly bulging lobes between the webs.

BRIEF DESCRIPTION OF THE DRAWING

The above and other features of my invention will now be described in greater detail with reference to the accompanying drawing in which.

SPECIFIC DESCRIPTION

Figure 1:
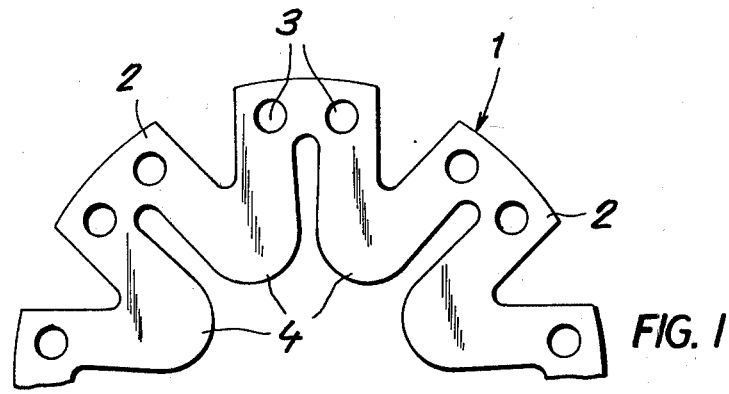
FIG. 1 is a face view of half of a centrally symmetrical foil embodying my invention.

A steel foil 1, shown in FIG. 1, is of angular configuration and forms eight peripherally spaced webs 2 separated by gaps which are bridged by elbow-shaped links 4 forming inwardly bulging lobes. Each web 2 is provided with a pair of mounting holes 3 to be aligned with corresponding holes of similar webs in a stack of identical foils.

Figure 2:
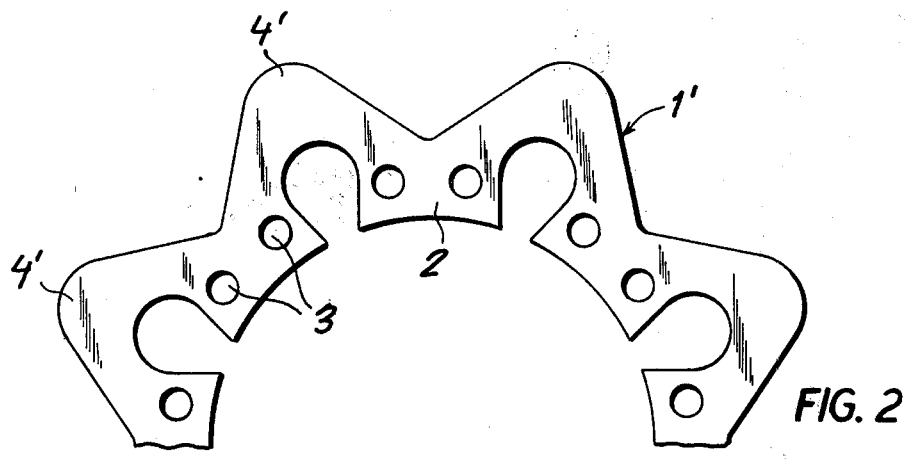
FIGS. 2 and 3 are views similar to FIG. 1, illustrating two modifications.

The foil 1' shown in FIG. 2 differs from the foil 1 of FIG. 1 in that the webs 2 thereof are interconnected by elbow-shaped links 4' forming outwardly bulging lobes. It will be apparent that the structure of FIG. 1 limits the outer diameter of the stack whereas that of FIG. 2 provides more space in the interior thereof. In each instance the holes 3 lie on an imaginary circle whose radius is more than half the maximum foil radius.

Figure 3:
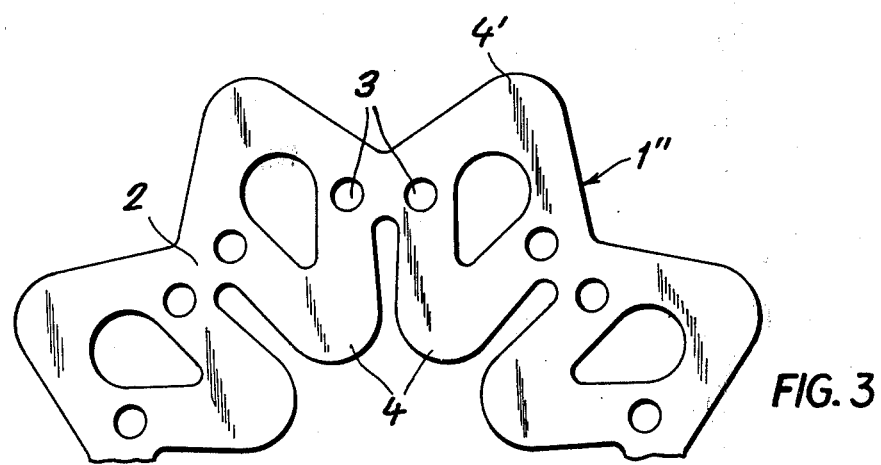

FIG. 3 illustrates a foil 1" which combines the features of the foils 1 and 1' of FIGS. 1 and 2 by having its webs 2 interconnected by inwardly and outwardly bulging links 4 and 4'. The legs of links 4 and 4' have approximately the same length. They form between them a set of inwardly converging voids 11 constituting the gaps between adjacent webs 2. The construction of FIG. 3 increases the strength of the foil without enlarging its outer diameter.

Figure 4:
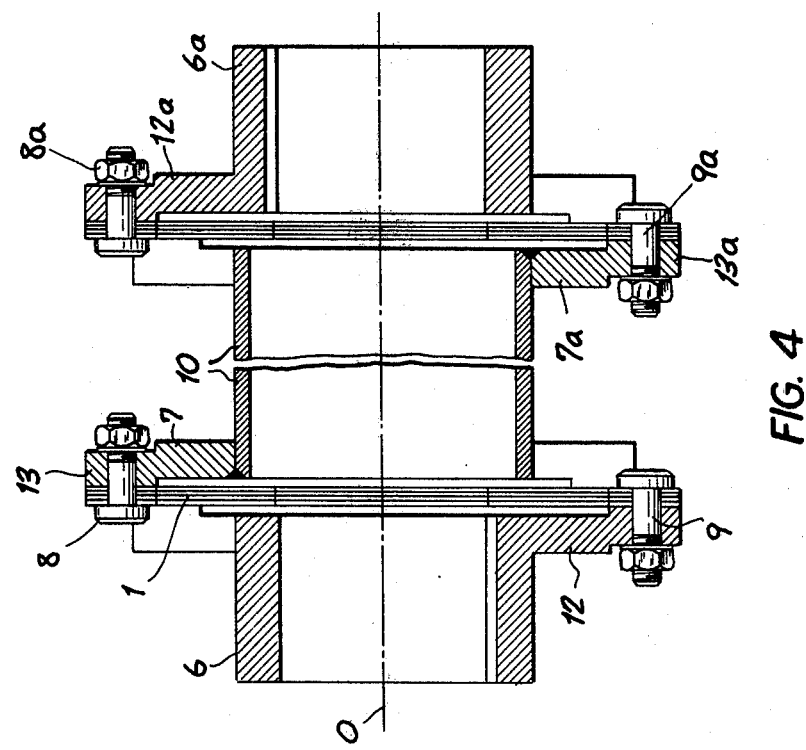
FIG. 4 is an axial sectional view of a shaft assembly with two joints according to my invention, each incorporating a stack of foils of the type shown in FIGS. 1 – 3.

FIG. 4 shows a pair of hubs 6, 6a which may be keyed to nonillustrated driving and driven shafts, respectively, and are connected to each other via a hollow transmission shaft 10 through a pair of joints each comprising a stack of foils 1 (or 1', 1") as illustrated in FIGS. 1 – 3. Hubs 6 and 6a have arms 12 and 12a which are spaced 90° apart and are aligned with alternate webs 2 in the stacks of foils 1. A pair of flanges 7 and 7a, mounted on opposite ends of shaft 10, have ears 13 and 13a also spaced 90° apart, in offset relationship with the arms 12 and 12a, to register with the remaining webs 2 of the two stacks. The connection between the respective webs and the ears 7 or 7a is effected by screws 8 and 8a passing through alternate pairs of holes 3; screws 9 and 9a, traversing the remaining holes 3, connect the other webs with the arms 12 and 12a of hubs 6 and 6a.

The two joints shown in FIG. 4 enable relative radial shifting of hubs 6, 6a and shaft 10 as well as limited relative rotation, e.g. to cushion the shock of acceleration or retardation. A certain inclination of the shaft 10 with reference to the common hub axis 0 is also possible. No appreciable restoring or biasing force is exerted by the joints upon the shaft 10 in the axial direction.

Figure 5:
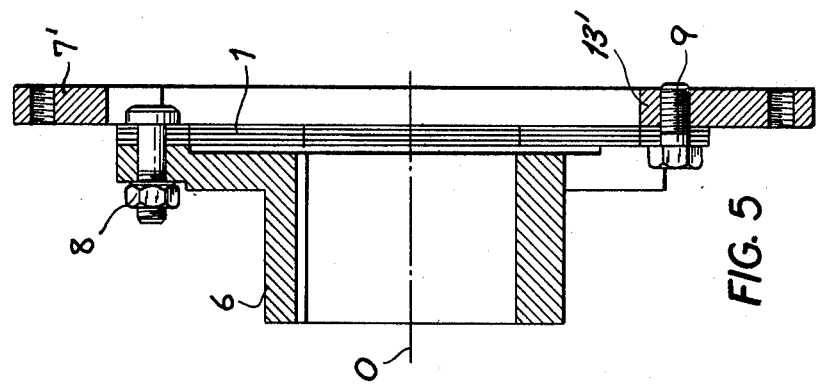
FIG. 5 is a view similar to FIG. 4, showing another type of assembly.

FIG. 5 shows a similar joint connected in like manner between a hub 6 and a larger flange 7' with inwardly rather than outwardly extending ears 13'. Flange 7' may be mounted, for example, on a flywheel driven by a motor whose shaft is keyed to the hub 6.

The provision of two mounting holes 3 per web 2, disposed symmetrically thereon, allows the joint to function even if one or more foils should split in operation.

I claim:

1. An elastic joint means for interconnecting a driving member and a driven member with limited relative angular and radial mobility, said joint means comprising a generally cylindrical stack of resilient, generally annular foils each forming an even number of peripherally equispaced webs separated by gaps and interconnected by flat integral links bridging said gaps, said webs being provided with mounting holes on a circle whose radius is greater than half the maximum radius of the foil, the webs of all foils being in mutual registry with their mounting holes aligned to form throughgoing bores for the passage of fasteners to secure alternate webs of each foil to said driving and said driven member, respectively.

2. An elastic joint means as defined in claim 1 wherein each of said webs is provided with a pair of mounting holes symmetrically positioned thereon.

3. An elastic joint means as defined in claim 1 wherein said links are generally elbow-shaped strips.

4. An elastic joint means as defined in claim 3 wherein said strips form outwardly bulging lobes between said webs.

5. An elastic joint means as defined in claim 3 wherein said strips form inwardly bulging lobes between said webs.

6. An elastic joint means as defined in claim 3 wherein said links form inwardly and outwardly bulging lobes between said webs.

7. An elastic joint means as defined in claim 1 wherein the number of webs per foil is eight.

8. In combination, a driving member, a driven member generally coaxial with said driving member, and an elastic joint means as defined in claim 1 interconnecting said members with limited relative angular and radial mobility.

* * * * *